US010714860B2

(12) United States Patent
Washio et al.

(10) Patent No.: US 10,714,860 B2
(45) Date of Patent: Jul. 14, 2020

(54) JOINT CONNECTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kazuhiro Washio, Mie (JP); Yasuo Omori, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 436 days.

(21) Appl. No.: 15/735,699

(22) PCT Filed: Jun. 3, 2016

(86) PCT No.: PCT/JP2016/066687
§ 371 (c)(1),
(2) Date: Dec. 12, 2017

(87) PCT Pub. No.: WO2016/208368
PCT Pub. Date: Dec. 29, 2016

(65) Prior Publication Data
US 2020/0036128 A1 Jan. 30, 2020

(30) Foreign Application Priority Data

Jun. 22, 2015 (JP) ................. 2015-124766

(51) Int. Cl.
*H01R 31/08* (2006.01)
*H01R 13/436* (2006.01)
*B60R 16/02* (2006.01)

(52) U.S. Cl.
CPC ..... *H01R 13/4362* (2013.01); *B60R 16/0207* (2013.01); *H01R 31/08* (2013.01)

(58) Field of Classification Search
CPC .... H01R 13/4362; H01R 31/08; H01R 13/42; H01R 13/6315; H01R 13/631; H01R 31/085; B60R 16/0207
(Continued)

(56) References Cited

U.S. PATENT DOCUMENTS 5,928,038 A * 7/1999 Berg .................. H01R 13/6272
439/489
6,010,374 A * 1/2000 Miwa ................. H01R 13/4362
439/752
(Continued)

FOREIGN PATENT DOCUMENTS

JP 4-18985 2/1992
JP 5-84076 11/1993
(Continued)

OTHER PUBLICATIONS

Joint Connector, JP2014049399 English Translation (Year: 2014).*
International Search Report dated Aug. 16, 2016.

*Primary Examiner* — Steven T Sawyer
(74) *Attorney, Agent, or Firm* — Gerald E. Hespos; Michael J. Porco; Matthew T. Hespos

(57) ABSTRACT

A joint connector includes shorting members (30), a housing body (HB) having a shorting member accommodating portion (50) for holding the shorting members (30), and a shorting member retainer (70). The shorting member (30) includes a base (32) extending in a shorting direction and shorting-side terminals (34, 36) projecting from this base (32) in a fitting direction. The shorting member retainer (70) is mounted into the housing body (HB) in a mounting/detaching direction intersecting both the shorting direction and the fitting direction. The shorting member retainer (70) (Continued)

includes shorting member constraining portions (74) configured to cross the shorting members (30) in the mounting/detaching direction to restrict movements of the shorting members (30) in the fitting direction.

5 Claims, 9 Drawing Sheets

(58) Field of Classification Search
USPC .................................................. 439/507, 511
See application file for complete search history.

(56) References Cited

U.S. PATENT DOCUMENTS

| | | | |
|---|---|---|---|
| 2005/0079758 A1* | 4/2005 | Fujii .................... | H01R 43/16 |
| | | | 439/507 |
| 2012/0184144 A1* | 7/2012 | Kikuchi ............... | H01R 13/428 |
| | | | 439/626 |
| 2014/0295708 A1* | 10/2014 | Omori .................. | H01R 13/422 |
| | | | 439/626 |
| 2015/0140847 A1* | 5/2015 | Kanemura ....... | H01R 13/62938 |
| | | | 439/259 |
| 2016/0141790 A1* | 5/2016 | Martin ............... | H01R 13/4362 |
| | | | 439/712 |

FOREIGN PATENT DOCUMENTS

| | | |
|---|---|---|
| JP | 6-7183 | 1/1994 |
| JP | 2005-353361 | 12/2005 |

\* cited by examiner

JOINT CONNECTOR

BACKGROUND

Field of the Invention

The invention relates to a joint connector for electrically shorting wires included in a wiring harness of an automotive vehicle or the like to each other.

Description of the Related Art

Japanese Unexamined Patent Publication No. 2005-353361 discloses a joint connector for shorting wires included in a wiring harness of an automotive vehicle or the like to each other. The joint connector of Japanese Unexamined Patent Publication No. 2005-353361 has a housing for receiving female wire-side terminals respectively crimped to ends of wires to be shorted and a joint terminal defining a shorting member made of metal to be fixed in this housing. The joint terminal integrally includes a busbar extending in an arrangement direction of the wire-side terminals and tab-like terminals extending from this busbar in a direction perpendicular to a longitudinal direction of the busbar. The wires are shorted by fitting each tab-like terminal and each wire-side terminal.

The joint terminal needs to be fixed in the housing so as to be held in the housing against a fitting force of the wire-side terminal to the tab-like terminal (force required to fit and separate the terminals). Accordingly, the housing of the joint connector described in Japanese Unexamined Patent Publication No. 2005-353361 includes an intermediate wall with insertion holes into which the respective tab-like terminals of the joint terminal can be press-fit. However, the press-fitting resistance has to be large for the housing to hold the joint terminal with a holding force sufficient to resist the fitting force. On the other hand, the larger the press-fitting resistance, the higher a possibility of cracking resin of the housing or the possibility of fracturing the tab-like terminals due to buckling or the like during a press-fitting operation. In recent years, wires have become thinner and terminals have become smaller and narrower. As a result, there is a high possibility of fracture of the tab-like terminals caused by setting the press-fitting resistance large.

An object of the invention is to a joint connector with a shorting member to be fit to wire-side terminals respectively mounted on wires and an insulating housing for holding the shorting member with a sufficient holding force without possibly causing the fracture of the insulating housing or the shorting member.

SUMMARY

The invention is directed to a joint connector for shorting wires to each other by electrically connecting wire-side terminals respectively mounted on ends of the wires to each other. The joint connector includes a shorting member made of a conductive material. The shorting member integrally includes a base extending in a shorting direction and shorting-side terminal portions projecting from the base in a terminal projecting direction that intersects the shorting direction. Each shorting-side terminal is shaped to fit to each wire-side terminal in a fitting direction parallel to the terminal projecting direction. An insulating housing holds the shorting member. The insulating housing includes a housing body having a shorting member accommodating portion for accommodating at least the base of the shorting member and a shorting member retainer to be detachably mounted into the housing body in a specific mounting/detaching direction to constrain the shorting member in the shorting member accommodating portion. The mounting/detaching direction is a direction intersecting with both the shorting direction and the fitting direction The shorting member retainer includes a shorting member constraining portion configured to cross the shorting member in the mounting/detaching direction to restrict a movement of the shorting member in the fitting direction.

DETAILED DESCRIPTION

Figure 1:
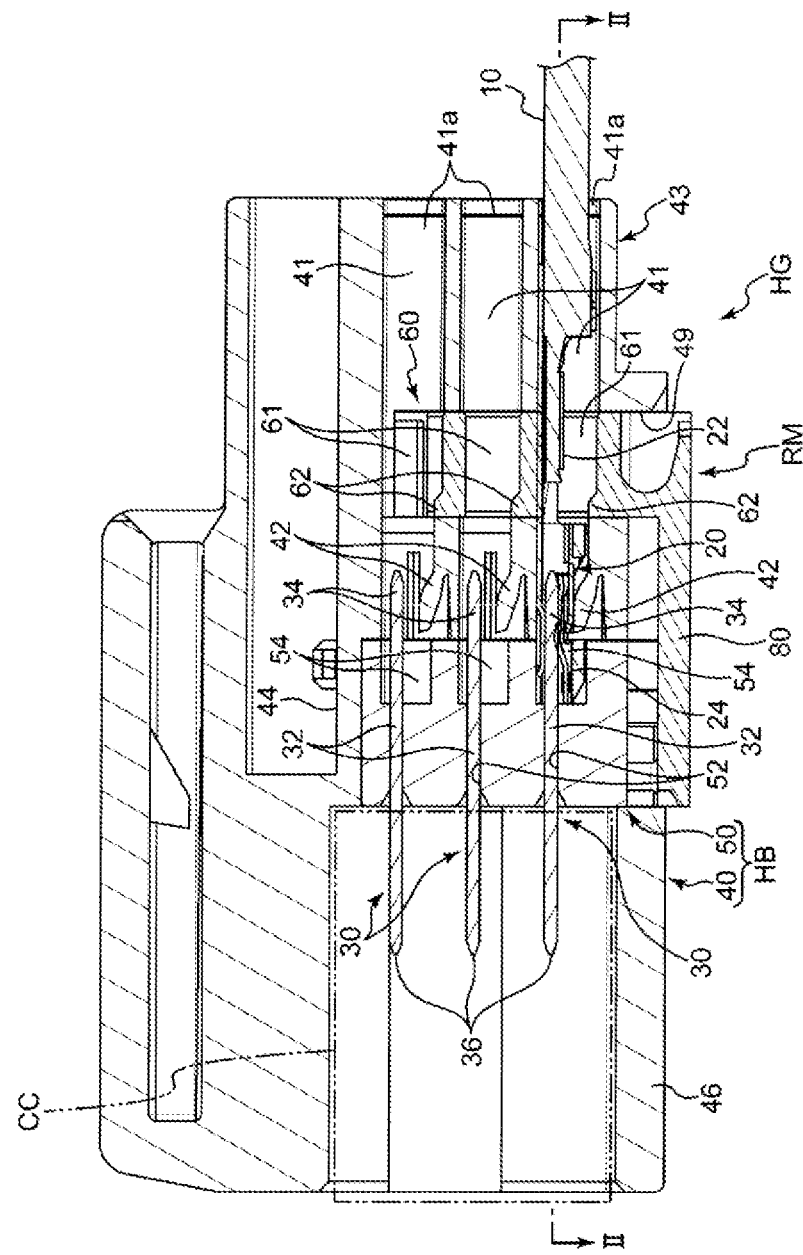
FIG. 1 is a side view in section along I-I of FIG. 3 showing a state where a wire-side terminal retainer of a joint connector according to an embodiment of the present invention is at a passage permitting position.
Figure 2:
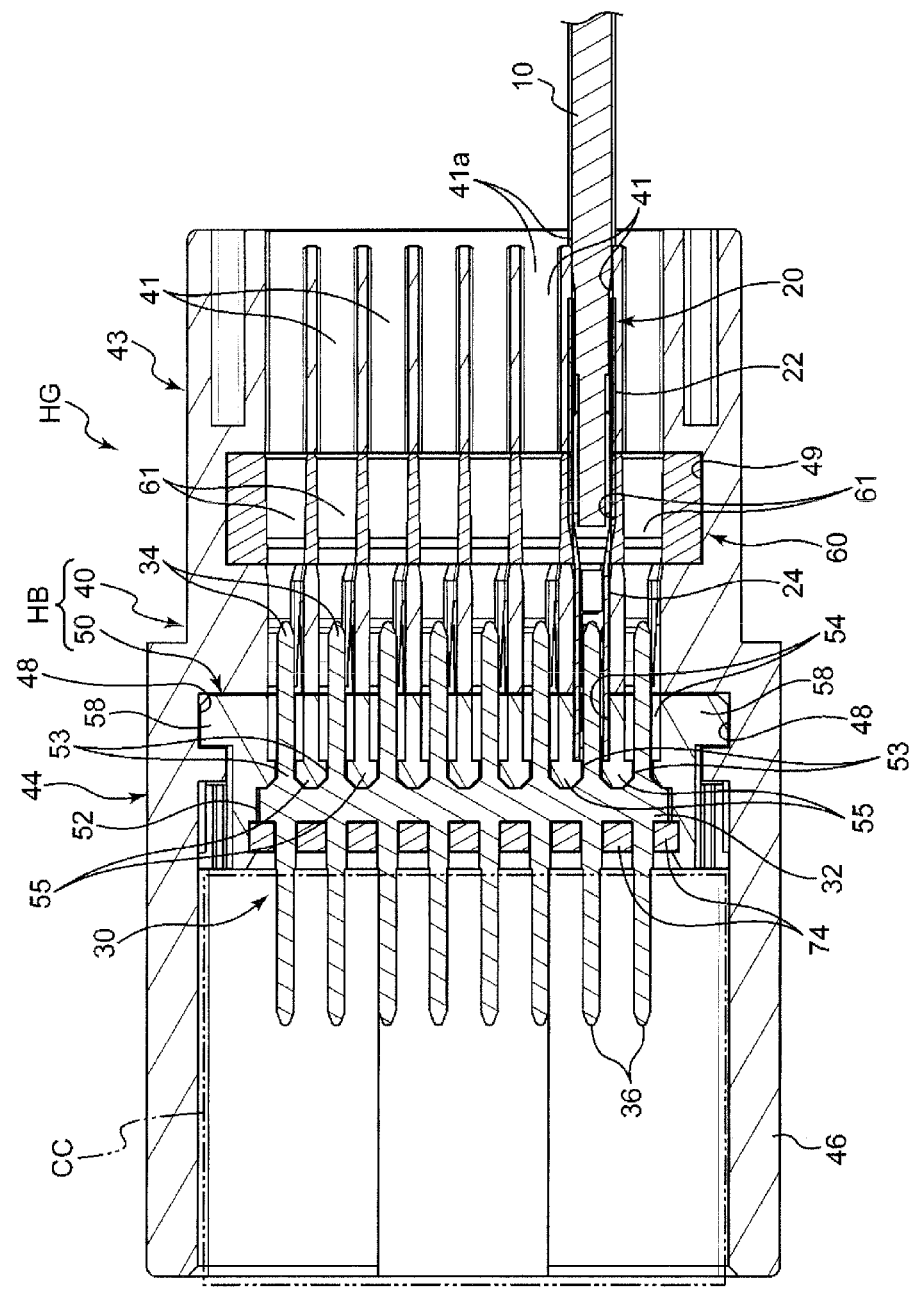
FIG. 2 is a plan view in section along II-II of FIG. 1.
Figure 3:
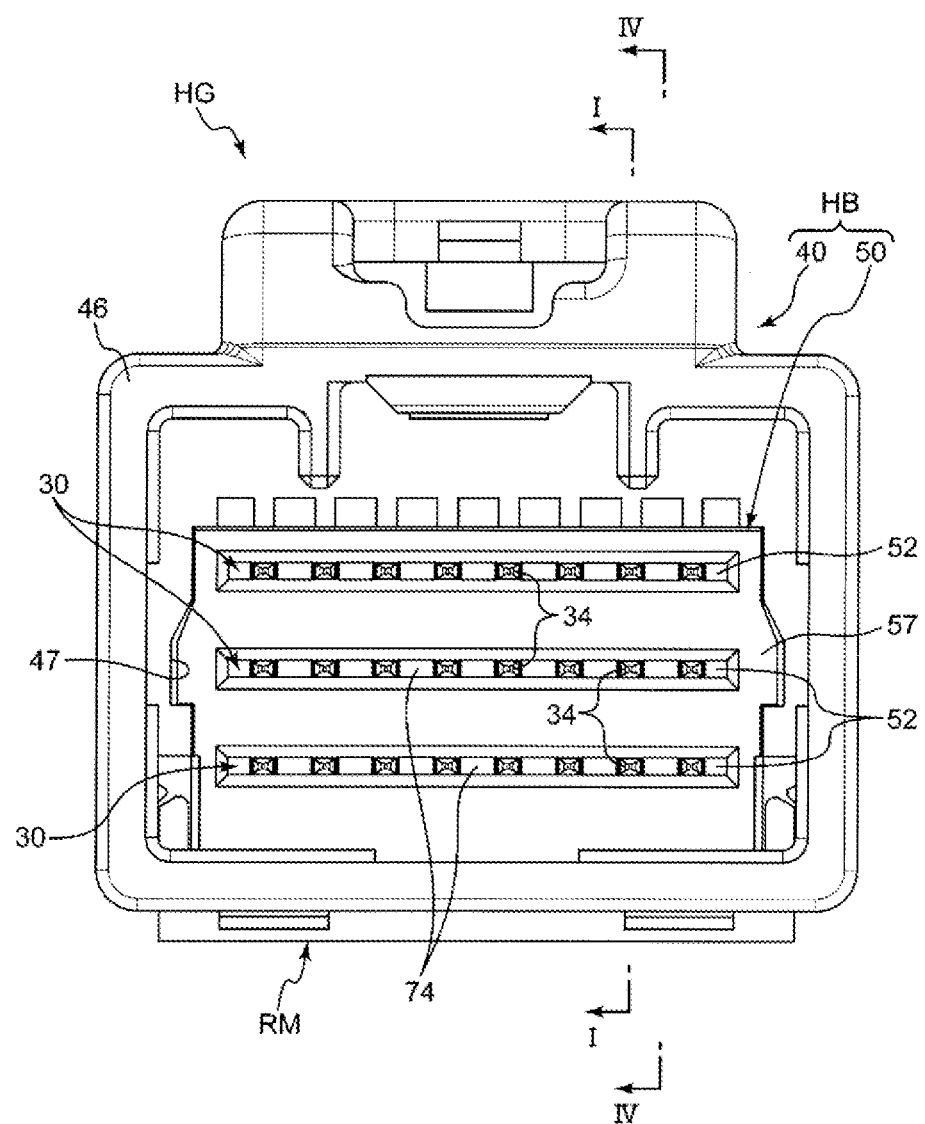
FIG. 3 is a front view of the joint connector viewed from the side of second shorting-side terminal portions.

A joint connector according to one embodiment of the invention is described with reference to FIGS. 1 to 9. This joint connector is configured for shorting wire-side terminals 20 respectively mounted on ends of wires 10 to each other and includes shorting members 30 and an insulating housing HG.

Each of the wire-side terminals 20 is a female terminal and includes a wire crimping portion 22 and an electrical contact portion 24 formed of a single metal plate. The wire crimping portion 22 is a part to be crimped to the end of the wire 10 and enables electrical conduction between the wire-side terminal 20 and a conductor of the wire 10 by being crimped. The electrical contact portion 24 is configured to electrically contact the shorting member 30. The electrical contact portion 24 is a female type and receives the shorting member 30 fit therein.

Each shorting member 30 is formed of a conductor and integrally includes a base 32, first shorting-side terminals 34 and second shorting-side terminals 36. Each shorting member 30 is formed of a single flat metal plate.

The base 32 extends in a specific shorting direction while having a constant width. The first shorting-side terminals 34 are arranged at intervals (equal intervals in a shown example) in the shorting direction and project in a first projecting direction perpendicular to the shorting direction. Each first shorting-side terminal 34 is fit into the female electrical contact portion 24 in a fitting direction parallel to the first projecting direction (i.e. direction parallel to an axial direction of the wire-side terminal 20) and electrically contact the electrical contact portion 24. The second shorting-side terminals 36 are arranged at equal intervals, like the first shorting-side terminals 34 in the shorting direction and project from the base portion in a second projecting direction opposite to the first projecting direction. The respective second shorting-side terminal portions 36 are shaped to fit in the fitting direction to connector terminals in a mating connector CC provided on an end of a wire bundle different from the wires 10 and shown by chain double-dashed line in FIGS. 1 and 2.

The insulating housing HG includes a housing body HB and a retainer RM to be mounted into this housing body HB. The housing body HB includes a shorting member accommodating portion 50 for accommodating the shorting members 30 and an outer portion 40 for accommodating this shorting member accommodating portion 50, and both portions are molded of an insulating material such as synthetic resin.

The outer portion 40 includes a terminal holding portion 43, a casing portion 44 and a receptacle 46. The terminal holding portion 43 has terminal accommodating chambers 41 and locking lances 42 are provided respectively in the terminal accommodating chambers 41. The terminal accommodating chambers 41 are shaped to receive the wire-side terminals 20 inserted along the axial directions of the wire-side terminals 20. Specifically, the terminal accommodating chambers 41 are arranged side by side in vertical and horizontal directions, i.e. arranged laterally side by side in each of stages located one above another, and each terminal accommodating chamber 41 includes a terminal insertion opening 41a open on one axial side (right side in FIGS. 1 and 2). Each wire-side terminal 20 can be inserted into the corresponding terminal accommodating chamber 41 through the terminal insertion opening 41a with the electrical contact portion 24 in the lead.

Figure 8:
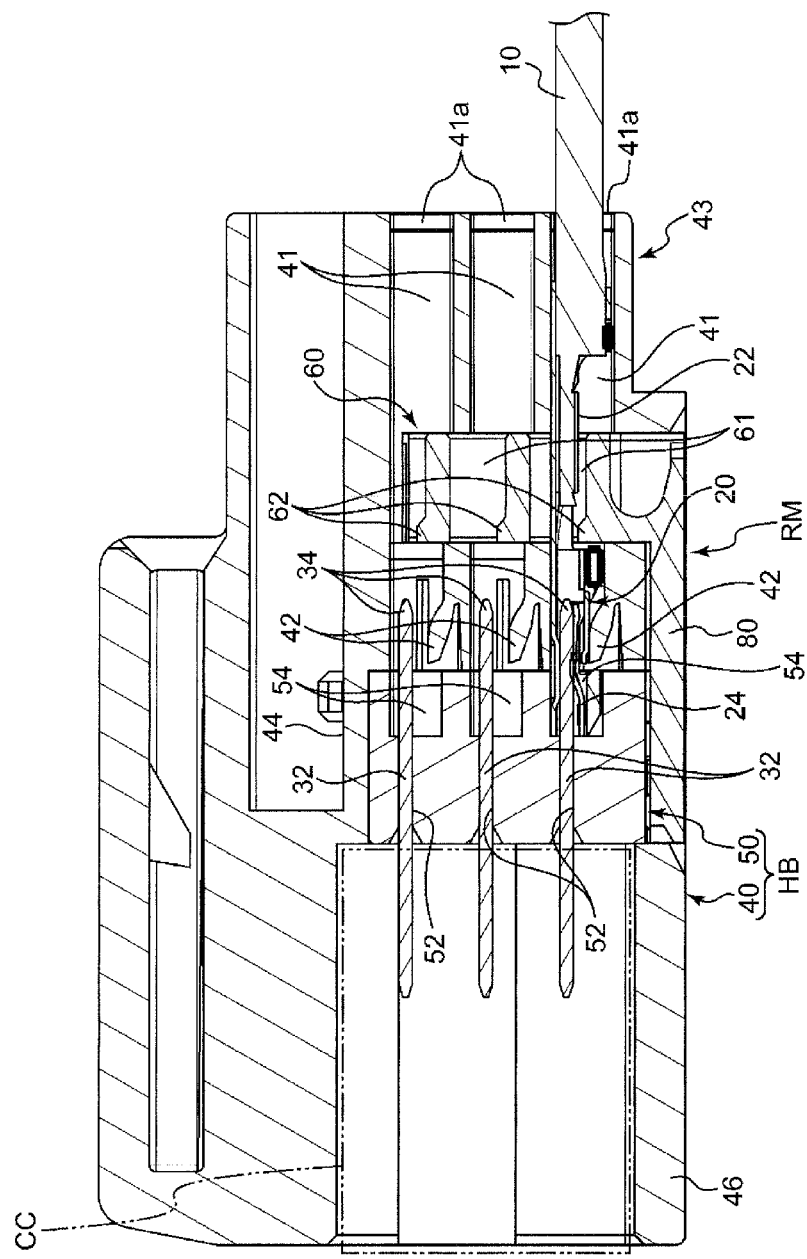
FIG. 8 is a side view in section, equivalent to a cross-section shown in FIG. 1, showing a state where the wire-side terminal retainer is at a locking position.
Figure 9:
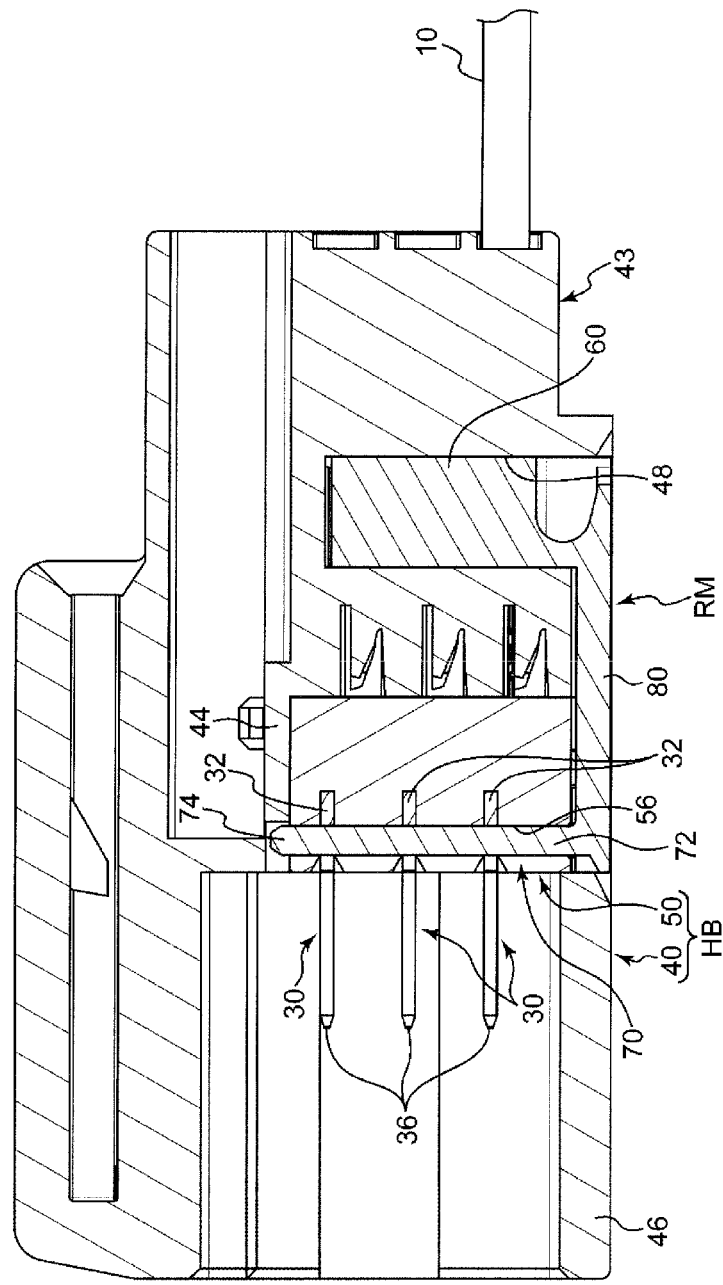
FIG. 9 is a side view in section, equivalent to a cross-section shown in FIG. 4, showing the state where the wire-side terminal retainer is at the locking position.

Each of the locking lances 42 defines a terminal locking portion for locking (primarily locking) the wire-side terminal 20 inserted into each terminal accommodating chamber 41. The locking lance 42 is a cantilever. Specifically, as shown in FIGS. 1 and 8, each locking lance 42 includes a base connected to a part of a wall defining the terminal accommodating chamber 41 and a tip at an end opposite to the base. This locking lance 42 is resiliently deformable such that the tip is resiliently displaced in a direction (down direction in FIG. 1) perpendicular to the axial direction of the wire-side terminal 20. The locking lance 42 allows the wire-side terminal 20 to be inserted into the terminal accommodating chamber 41 as the tip is displaced resiliently in a direction to retract from the wire-side terminal 20 (up direction in FIG. 1), while locking (primarily locking) the wire-side terminal 20 in the terminal accommodating chamber 41 when the tip partially resiliently returns when the wire-side terminal 20 is inserted completely in the terminal accommodating chamber 41. Specifically, the tip of the locking lance 42 engages a suitable part (intermediate part of the electrical contact portion 24 in an example of FIGS. 4 and 5) of the inserted wire-side terminal 20, thereby impeding the separation of the wire-side terminal 20.

The casing 44 is adjacent to the terminal holding portion 43 on a side (left side in FIGS. 1 and 2) opposite to the respective terminal insertion openings 41a and accommodates the shorting member accommodating portion 50. The receptacle 46 extends from the casing 44 toward a side (left side in FIGS. 1 and 2) opposite to the terminal holding portion 43.

The shorting member accommodating portion 50 has a substantially rectangular parallelepiped shape in this embodiment m and is configured to accommodate at least the bases 32 of the shorting members 30. The shorting member accommodating portion 50 according to this embodiment accommodates the bases 32 of the shorting members 30 and a part of each first shorting-side terminal 34 in a state where the shorting members 30 are arranged in stages located one above another and each shorting member 30 penetrates through the shorting member accommodating portion 50 in a direction parallel to the axial directions of the wire-side terminals 20.

This shorting member accommodating portion 50 is accommodated and held in the casing 44 of the outer portion 40. This shorting member accommodating portion 50 is held at a position where the first shorting-side terminals 34 of each shorting member 30 can project from sides (left side in FIGS. 1 and 2) of the respective terminal accommodating chambers 41 opposite to the terminal insertion openings 41a and the electrical contact portions 24 of the wire-side terminals 20 inserted in the respective terminal accommodating chambers 41 can be fit to the first shorting-side terminals 34 (specifically, the first shorting-side terminals 34 can be fit into the electrical contact portions 24). The shorting member accommodating portion 50 includes a base inserting portion 52 that is open toward the receptacle 46 and receives the bases 32 of the respective shorting member 30 inserted from the side of the receptacle 46, terminal insertion holes 53 that communicate with the base inserting portion 52 and receive the respective inserted first shorting-side terminal 34, terminal receiving recesses 54 that receive the electrical contact portions 24 of the respective wire-side terminals 20 to be fit to the first shorting-side terminals 34, and body-side constraining portions 55 that constrain the bases 32. The body-side constraining portions 55 are located at both sides of each terminal insertion hole 53 of the shorting member accommodating portion 50 in the connector lateral direction, and constrain the bases 32 to restrict displacements of the bases 32 toward the first shorting-side terminals 34 by coming into contact with the bases 32 inserted into the base inserting portion 52 from a side opposite to the second shorting-side terminals 36.

The casing 44 accommodates and holds the shorting member accommodating portion 50. Specifically, constrained portions 57, 58 to be constrained by the casing 44 are provided at suitable positions of the outer peripheral surface of the shorting member accommodating portion 50, whereas the casing 44 includes constraining portions 47, 48 for respectively constraining the constrained portions 57, 58.

Note that the outer portion 40 and the shorting member accommodating portion 50 may be molded integrally as a single member.

The receptacle 46 is shaped to surround each second shorting-side terminal 36 projecting from the shorting member accommodating portion 50 and receives an inserted housing of the mating connector CC. As just described, this receptacle 46 constitutes a connector part connectable to the mating connector CC together with the respective second shorting-side terminals 36. The retainer member RM integrally includes a wire-side terminal retainer 60 for secondarily locking each wire-side terminal 20, a shorting member retainer 70 as a characteristic feature of the joint connector according to this embodiment and a retainer coupling 80 that couples the retainers 60, 70. This retainer member RM is mounted in a predetermined mounting/detaching direction into the housing body HB. This mounting/detaching direction may be a direction intersecting both the shorting direction and the fitting direction. The mounting/detaching direction according to this embodiment is perpendicular to both the shorting direction and the fitting direction.

The wire-side terminal retainer 60 is mounted into the terminal holding portion 43 of the outer portion 40, thereby locking (secondarily locking) the wire-side terminals 20 inserted into the respective terminal accommodating portions 41 of the terminal holding portion 43 in addition to locking by the locking lances 42. Specifically, this wire-side terminal retainer 60 is shaped to define windows 61 and each window 61 constitutes a specific part of each terminal accommodating portion 41 behind the locking lance 42. The wire-side terminal retainer 60 includes locking projections 62 for respectively locking the specific parts (rear ends of the wire crimping portions 22 in FIG. 1) of the wire-side terminals 20 inserted into the respective terminal accommodating portions 41.

Figure 4:
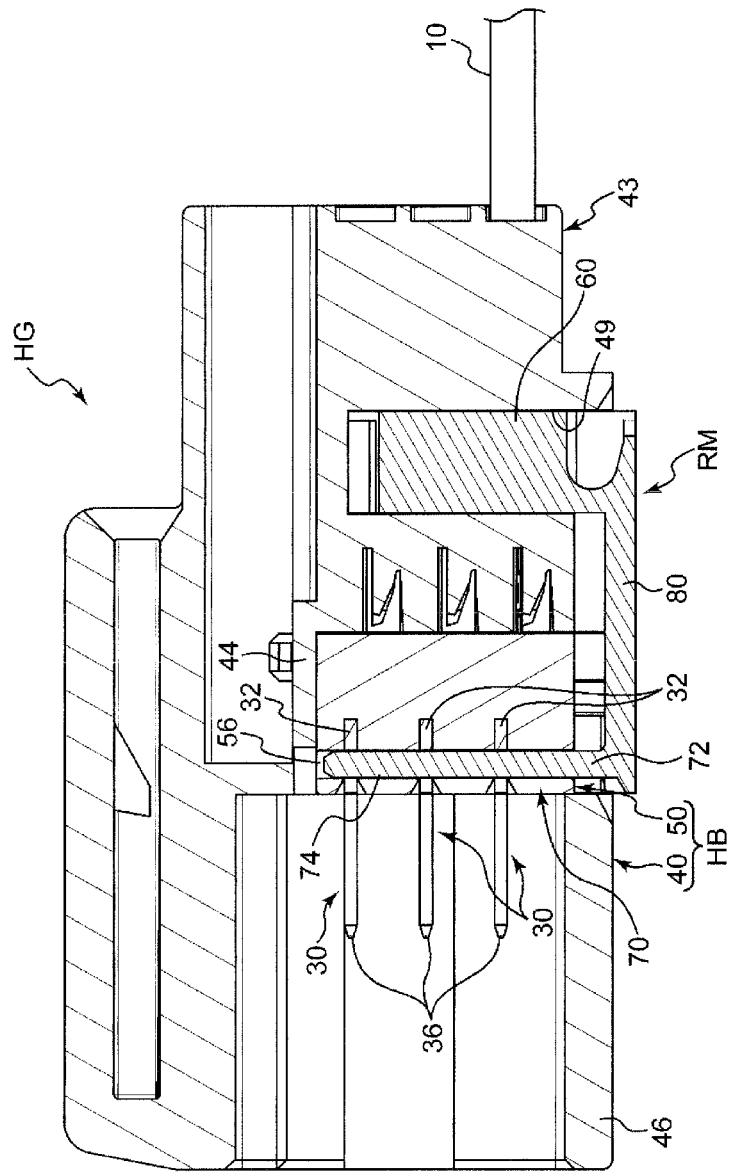
FIG. 4 is a side view in section along IV-IV of FIG. 3 of the joint connector.
Figure 5:
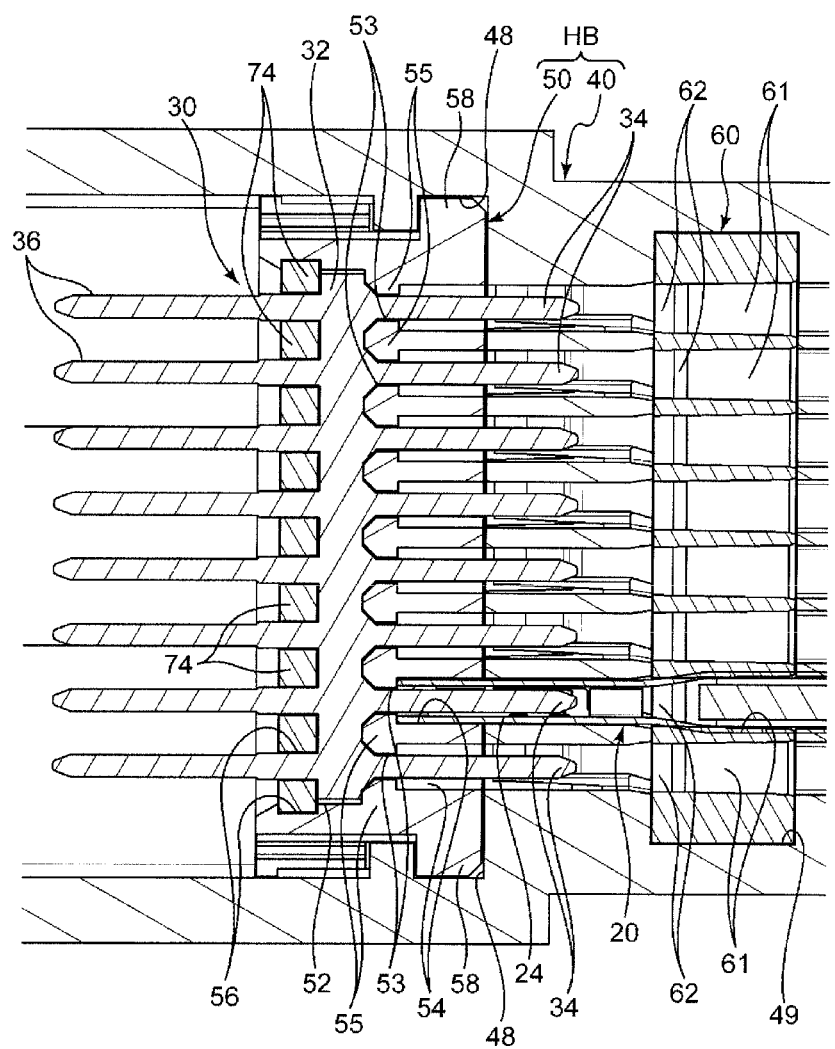
FIG. 5 is a plan view in section enlargedly showing an essential part of the joint connector shown in FIG. 2.
Figure 6:
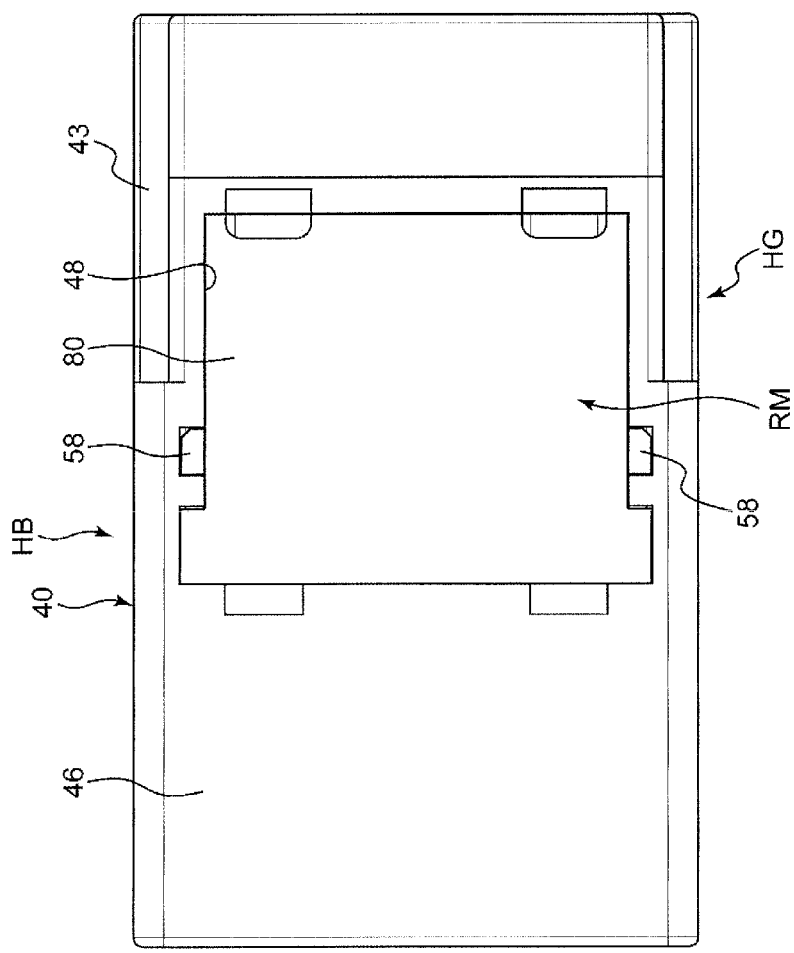
FIG. 6 is a bottom view of the joint connector.

This wire-side terminal retainer 60 is movable between a locking position shown in FIGS. 1 and 4 and a passage permitting position. The locking position is a position where the locking projections 62 of the wire-side terminal retainer 60 lock the wire-side terminals 20. The passage permitting position is a position separated from the locking position shown in FIGS. 8 and 9 in the mounting/detaching direction (direction perpendicular to the axial directions of the wire-side terminals 20 in this embodiment; downward direction in FIG. 1). At the passage permitting position, each window 61 is aligned with another part of the corresponding terminal accommodating portion 41. Thus, the electrical contact portion 24 of the wire-side terminal 20 is permitted to pass through the window 61 (i.e. penetrate through the wire-side terminal retainer 60) and to be fit to the first shorting-side terminal portion 34.

The shorting member retainer 70 is mounted detachably into the housing HB in the mounting/detaching direction together with the wire-side terminal retainer 60 to constrain the shorting members 30 in the shorting member accommodating portion 50. The mounting/detaching direction only has to intersect both the shorting direction and the fitting direction as described above. In this embodiment, the mounting/detaching direction is a direction (vertical direction in FIGS. 1 and 4) perpendicular to both the shorting direction and the fitting direction.

Figure 7:
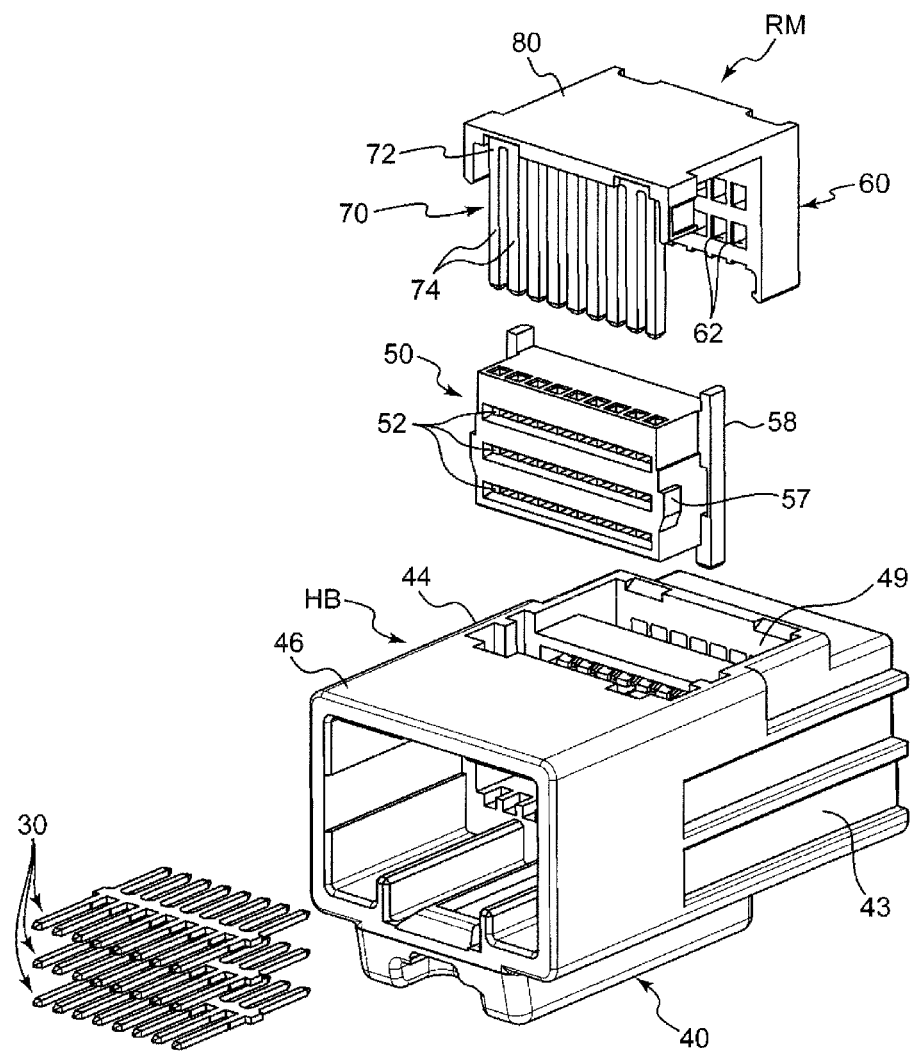
FIG. 7 is an exploded perspective view of the joint connector viewed from the side of a receptacle.

The shorting member retainer 70 includes a shorting member constraining portion that crosses the shorting members 30 in the mounting/detaching direction to restrict movements of the shorting members 30 in the second projecting direction (direction toward the receptacle 46), which is the fitting direction. Specifically, this shorting member retainer 70 includes a base 72 extending in the connector lateral direction (direction parallel to the shorting direction) and constraining pieces 74 extending from this base 72 in a direction parallel to the mounting/detaching direction, as shown in FIG. 7.

The respective constraining pieces 74 constrain the bases 32 by being located on a side opposite to the body-side constraining portions 55 across the bases 32 of the shorting members 30 in the fitting direction. The respective constraining pieces 74 constrain the bases 32 in the fitting direction and constrain the respective second shorting-side terminals 36 in a direction perpendicular to the fitting direction (direction parallel to the shorting direction) by crossing between mutually adjacent ones of the plurality of second shorting-side terminals 36 near the bases 32. In contrast, the shorting member accommodating portion 50 is formed with fitting holes 56 for permitting each constraining piece 74 to cross. These fitting holes 56 extend in a direction parallel to the mounting/detaching direction and have a cross-sectional shape that permits each constraining piece 74 to be fit into the fitting hole 56. Each constraining piece 74 can cross the shorting member 30 by being fit.

The retainer coupling 80 couples one end (lower end in FIG. 1) of the wire-side terminal retainer 60 in the mounting/detaching direction and one end (lower end in FIG. 1) of the shorting member retainer 70 in the mounting/detaching direction to each other, thereby integrating the retainers 60, 70 so that the retainers 60, 70 are interlocked with each other. Thus, the shorting member 70 also moves in the mounting/detaching direction in conjunction with a movement of the wire-side terminal retainer 60 in the mounting/detaching direction between the passage permitting position shown in FIGS. 1 and 4 and the locking position shown in FIGS. 8 and 9. Each constraining piece 74 of the shorting member retainer 70 has a length capable of crossing and constraining the shorting members 30 both when the wire-side terminal retainer 60 is at the passage permitting position and when the wire-side terminal retainer 60 is at the locking position.

In this joint connector, the shorting members 30 can be constrained in the shorting member accommodating portion 50 and held with a holding force sufficient to resist the fitting force acting on the shorting members 30 by the insertion (not accompanied by press-fitting) of the shorting members 30 into the base inserting portion 52 and the terminal insertion holes 53 of the shorting member accommodating portion 50 and the mounting of the shorting member retainer 70 into the shorting member accommodating portion 50 after the insertion. Specifically, in this embodiment, each shorting member 30 can be constrained in the shorting member accommodating portion 50 by constraint by the body-side constraining portions 55 and constraint by each constraining piece 74 of the shorting member retainer 70 in the shorting member accommodating portion 50. After each wire-side terminal 20 is inserted into each terminal accommodating chamber 41 and fit to each first shorting-side terminal portion 34 in a state where the wire-side terminal retainer 60 mounted into the housing body HB together with the shorting member retainer 70 is located at the passage permitting position, the wire-side terminal retainer 70 is moved from the passage permitting position to the locking position, whereby each wire-side terminal 20 can be locked secondarily. Specifically, according to this joint connector, at least some of movements of the shorting member 30 accommodated in the shorting member accommodating portion 50 are restricted by the constraining pieces 74 of the shorting member retainer 70 crossing the shorting member 30 in the mounting/detaching direction. Thus, the shorting member 30 need not be press-fit tightly into the insulating housing HG to restrict these movements. Therefore, the shorting member 30 can be held in the shorting member accommodating portion 50 with a sufficient holding force as described above without causing the fracture of the insulating housing HG or the shorting member 30 by the press-fitting.

However, the invention does not completely exclude the press-fitting of the shorting member into the shorting member accommodating portion. Even if the shorting member is press-fit into the shorting member accommodating portion, the fracture of the shorting member accommodating portion or the shorting member can be avoided by suppressing the press-fitting resistance thereof and a shortage of the holding force caused by a small press-fitting resistance can be solved by mounting the shorting member retainer into the housing. The number of the shorting members does not matter in the present invention. The present invention also encompasses, for example, joint connectors including only a single shorting member. However, a joint connector in which plural shorting members 30 are arranged side by side in a direction (vertical direction in this embodiment) parallel to the mounting/detaching direction of the shorting member retainer 70 and the common shorting member constraining portion (e.g. the plurality of constraining pieces 74) crosses these shorting members 30 is advantageous in being able to constrain the shorting members 30 by a structure with a small number of components in addition to being able to form a shorting circuit capable of shorting many wires to each other by the shorting members 30.

Although the shorting members 30 are constrained in the fitting direction by the cooperation of the body-side constraining portions 55 of the shorting member accommodating portion 50 and the shorting member retainer 70 in this embodiment, it is also possible to constrain the shorting members 30 in the fitting direction only by the shorting member retainer 70. For example, the shorting member retainer 70 may be provided with parts corresponding to the body-side constraining portions 55 together with the constraining pieces 74. However, constraint by the cooperation of the body-side constraining portions and the shorting member retainer as described above has an advantage of being able to simplify the shape of the shorting member retainer.

Further, the shape of a part of the shorting member 70 for constraining the shorting members 30 is not limited to the one including the plurality of constraining pieces 74 according to this embodiment. For example, if the second shorting-side terminal portions 36 of the shorting members 30 are omitted, the part of the shorting member retainer 70 for constraining the shorting members 30 may be a linear part configured to come into contact with sides of the bases 32 opposite to the first shorting-side terminal portions 34 along these sides.

Furthermore, the shorting member retainer according to the present invention is not limited to the one integrated with the wire-side terminal retainer 60 like the shorting member retainer 70. The present invention also encompasses joint connectors not including a wire-side terminal retainer and joint connectors including a wire-side terminal retainer separated from a shorting member retainer. As described above, a joint connector is provided which includes a shorting member to be fit to wire-side terminals respectively mounted on ends of wires and an insulating housing for holding the shorting member and in which the insulating housing can hold the shorting member with a sufficient holding force without possibly causing the fracture of the insulating housing or the shorting member.

The invention provides a joint connector for shorting a plurality of wires to each other by electrically connecting wire-side terminals respectively mounted on ends of the wires to each other. The joint connector includes a shorting member made of a conductive material, integrally including a base extending in a shorting direction and shorting-side terminals projecting from the base in a terminal projecting direction intersecting the shorting direction. Each shorting-side terminal portion is shaped to fit to each wire-side terminal in a fitting direction parallel to the terminal projecting direction, and an insulating housing for holding the shorting member. The insulating housing includes a housing body having a shorting member accommodating portion for accommodating at least the base of the shorting member and a shorting member retainer to be detachably mounted into the housing body in a specific mounting/detaching direction to constrain the shorting member in the shorting member accommodating portion. The mounting/detaching direction is a direction intersecting with both the shorting direction and the fitting direction, and the shorting member retainer includes a shorting member constraining portion configured to cross the shorting member in the mounting/detaching direction to restrict a movement of the shorting member in the fitting direction.

According to this joint connector, the movement of the shorting member accommodated in the shorting member accommodating portion in the fitting direction is restricted by the shorting member constraining portion of the shorting member retainer crossing the shorting member in the mounting/detaching direction. Thus, the shorting member need not be press-fit tightly into the insulating housing to restrict this movement. Therefore, the shorting member can be held in the shorting member accommodating portion with a holding force sufficient to resist a fitting force acting on the shorting member, i.e. a force acting on the shorting member in fitting and separating the shorting-side terminal portions of the shorting member and the wire-side terminals by constraint by the shorting member constraining portion without causing the fracture of the insulating housing or the shorting member by the press-fitting.

The shorting member constraining portion may not restrict all movements of the shorting member in the fitting direction. Even if some of movements are restricted, it can be made unnecessary to press-fit the shorting member tightly into the insulating housing. For example, the shorting member accommodating portion of the housing body may include a body-side constraining portion located on one side of the base of the shorting member in the fitting direction, whereas the shorting member constraining portion of the shorting member retainer may cross a side opposite in the fitting direction to the body-side constraining portion across the base in the mounting/detaching direction. In this structure, the shorting member can be constrained from both sides in the fitting direction by the cooperation of the body-side constraining portion and the shorting member constraining portion of the shorting member retainer.

The shorting member constraining portion of the shorting member retainer may include constraining pieces configured to cross between the shorting-side terminals that are adjacent. These constraining pieces can constrain each shorting-side terminal portion in a direction perpendicular to the fitting direction in addition to constraining the shorting member in the fitting direction. The present invention is applicable also to a joint connector including a plurality of the shorting members. In this case, the joint connector in which the shorting members are arranged side by side in a direction parallel to the mounting/detaching direction and the common shorting member constraining portion crosses these shorting members is advantageous in being able to constrain the shorting members by a structure with a small number of components in addition to being able to form a shorting circuit capable of shorting many wires to each other by the shorting members.

In the joint connector according to the invention, the housing body may further include a terminal holding portion for holding the wire-side terminals to be fit to each shorting-side terminal, the joint connector further includes a wire-side terminal retainer to be mounted into the housing body to be movable in the direction parallel to the mounting/detaching direction of the shorting member retainer between a passage permitting position where the passage of the wire-side terminals toward the shorting-side terminal portions is permitted and a locking position where the wire-side terminals fit to the shorting-side terminal portions are locked and a retainer coupling couples the wire-side terminal retainer and the shorting member retainer such that the retainers are interlocked with each other and move in the mounting/detaching direction, the shorting member retainer, the wire-side terminal retainer and the retainer coupling are formed integrally or unitarily as a single retainer member, and the shorting member constraining portion of the shorting member retainer is shaped to constrain the shorting member both when the wire-side terminal retainer is at the passage permitting position and when the wire-side terminal retainer is at the locking position.

In this joint connector, the shorting member can be constrained in the shorting member accommodating portion and each wire-side terminal can be locked in the terminal holding portion by a structure with a small number of components in which the wire-side terminal retainer and the shorting member retainer are integrated via the retainer coupling.

The invention claimed is:

1. A joint connector for shorting wires to each other by electrically connecting wire-side terminals respectively mounted on ends of the wires to each other, comprising:
    a shorting member made of a conductive material, the shorting member integrally including a base extending in a shorting direction and shorting-side terminal projecting from the base in a terminal projecting direction intersecting the shorting direction, each shorting-side terminal being shaped to fit to each wire-side terminal in a fitting direction parallel to the terminal projecting direction; and
    an insulating housing for holding the shorting member;
    wherein the insulating housing includes a housing body having a shorting member accommodating portion for accommodating at least the base of the shorting member and a shorting member retainer to be detachably mounted into the housing body in a specific mounting/detaching direction to constrain the shorting member in the shorting member accommodating portion, the mounting/detaching direction intersecting with both the shorting direction and the fitting direction, and the shorting member retainer includes a shorting member constraining portion configured to cross the shorting member in the mounting/detaching direction to restrict a movement of the shorting member in the fitting direction.

2. The joint connector of claim 1, wherein the shorting member accommodating portion of the housing body includes a body-side constraining portion located on one side of the base of the shorting member in the fitting direction, whereas the shorting member constraining portion of the shorting member retainer crosses a side opposite in the fitting direction to the body-side constraining portion across the base in the mounting/detaching direction.

3. The joint connector claim 1, wherein the shorting member constraining portion of the shorting member retainer includes constraining pieces configured to cross between the shorting-side terminal that are adjacent to one another.

4. The joint connector of claim 1, comprising plural shorting members, the shorting members being arranged side by side in a direction parallel to the mounting/detaching direction, and the shorting member retainer is mounted into the housing body such that the shorting member constraining portion crosses the shorting members.

5. The joint connector of claim 1, wherein the housing body further includes a terminal holding portion for holding the wire-side terminals to be fit to each shorting-side terminal, the joint connector further includes a wire-side terminal retainer to be mounted into the housing body to be movable in the direction parallel to the mounting/detaching direction of the shorting member retainer between a passage permitting position where the passage of the wire-side terminals toward the shorting-side terminal is permitted and a locking position where the wire-side terminals fit to the shorting-side terminal are locked and a retainer coupling that couples the wire-side terminal retainer and the shorting member retainer such that the both retainers are interlocked with each other and move in the mounting/detaching direction, the shorting member retainer, the wire-side terminal retainer and the retainer coupling are formed integrally as a single retainer member, and the shorting member constraining portion of the shorting member retainer is shaped to constrain the shorting member both when the wire-side terminal retainer is at the passage permitting position and when the wire-side terminal retainer is at the locking position.

* * * * *